US012705769B2

(12) United States Patent
Chiu et al.

(10) Patent No.: US 12,705,769 B2
(45) Date of Patent: Aug. 11, 2026

(54) DEPTH COMPLETION METHOD OF SPARSE DEPTH MAP AND SYSTEM THEREOF

(71) Applicant: HIMAX TECHNOLOGIES LIMITED, Tainan City (TW)

(72) Inventors: Hong-Yu Chiu, Tainan City (TW); Yi-Nung Liu, Tainan City (TW)

(73) Assignee: HIMAX TECHNOLOGIES LIMITED, Tainan City (TW)

( * ) Notice: Subject to any disclaimer, the term of this patent is extended or adjusted under 35 U.S.C. 154(b) by 631 days.

(21) Appl. No.: 18/180,104

(22) Filed: Mar. 7, 2023

(65) Prior Publication Data

US 2024/0303844 A1 Sep. 12, 2024

(51) Int. Cl.
*G06T 7/55* (2017.01)
*G06T 3/4007* (2024.01)
*G06T 3/4046* (2024.01)
*G06T 7/521* (2017.01)

(52) U.S. Cl.
CPC .............. *G06T 7/55* (2017.01); *G06T 3/4007* (2013.01); *G06T 3/4046* (2013.01); *G06T 7/521* (2017.01); *G06T 2207/10028* (2013.01); *G06T 2207/20084* (2013.01)

(58) Field of Classification Search
CPC .......... G06N 3/082; G06T 2207/10004; G06T 2207/10028; G06T 2207/20081; G06T 2207/20084; G06T 2207/20221; G06T 3/4007; G06T 3/4046; G06T 7/50; G06T 7/521; G06T 7/55; G06V 10/82
See application file for complete search history.

(56) References Cited

U.S. PATENT DOCUMENTS 9,237,330 B2 1/2016 Wang et al.
2024/0273742 A1* 8/2024 Das ...................... G06V 10/768

FOREIGN PATENT DOCUMENTS

CN 108304928 A 7/2018
CN 109492754 A 3/2019
CN 110992271 A 4/2020
CN 112085844 A 12/2020
CN 112668416 A 4/2021
JP 2022-521253 A 4/2022
(Continued)

OTHER PUBLICATIONS

Xiaowen Jiang et al., "A Low Memory Footprint Quantized Neural Network for Depth Completion of Very Sparse Time-of-Flight Depth Maps" in 2022 IEEE/CVF Conference on Computer Vision and Pattern Recognition Workshops (CVPRW), pp. 2686-2695, 2022.
(Continued)

*Primary Examiner* — Zhiyu Lu
(74) *Attorney, Agent, or Firm* — CKC & Partners Co., LLC

(57) ABSTRACT

A depth completion method of sparse depth map includes: acquiring a grayscale image and a sparse depth map corresponding to the grayscale image; obtaining a nearest neighbor interpolation (NNI) image and a Euclidean distance transform (EDT) image based on the sparse depth map; inputting the grayscale image, the NNI image, and the EDT image into a neural network model, thereby outputting a predicted residual map; and generating a predicted dense depth map according to the predicted residual map and the NNI image.

17 Claims, 6 Drawing Sheets

(56) References Cited

FOREIGN PATENT DOCUMENTS

| | | |
|---|---|---|
| TW | 201130306 A | 9/2011 |
| TW | 201234278 A | 8/2012 |

OTHER PUBLICATIONS

Zhao Chen et al. “Estimating depth from RGB and sparse sensing.” Proceedings of the European Conference on Computer Vision (ECCV), pp. 176-192, 2018.

Xiaowen Jiang et al., “A Low Memory Footprint Quantized Neural Network for Depth Completion of Very Sparse Time-of-Flight Depth Maps”, arXiv:2205.12918 [cs.CV], pp. 2687-2696, May 25, 2022.

* cited by examiner

DEPTH COMPLETION METHOD OF SPARSE DEPTH MAP AND SYSTEM THEREOF

BACKGROUND

Field of Invention

The present invention relates to a depth completion method. More particularly, the present invention relates to a depth completion method of sparse depth map and system thereof.

Description of Related Art

Time-of-flight (ToF) sensors are active depth sensing devices with the potential to provide more reliable scene understanding by true 3D perception. Due to their low power consumption and accuracy at real-time frame rates, ToF sensors were recently integrated in mobile consumer devices. However, ToF relies on active illumination which accounts for a relevant part of its power consumption. In addition, ToF sensor can provide accurate 3D information, but the resolution can be far lower than that of a color image if using projector with fewer points for eye safety and low power consumption. To use the limited power budget of a mobile device more efficiently, the scene can be illuminated with a dot pattern light source so that its radiant intensity concentrates onto a small number of regions (dots). A low power ToF sensor for indoors 3D perception typically captures 500~1500 dots per frame. Because of this sparsity level, sensor fusion techniques are necessary to obtain dense depth maps.

SUMMARY

The present invention provides a depth completion method of sparse depth map. The depth completion method includes: acquiring a grayscale image and a sparse depth map corresponding to the grayscale image; obtaining a nearest neighbor interpolation (NNI) image and a Euclidean distance transform (EDT) image based on the sparse depth map; inputting the grayscale image, the NNI image, and the EDT image into a neural network model, thereby outputting a predicted residual map; and generating a predicted dense depth map according to the predicted residual map and the NNI image.

In accordance with one or more embodiments of the invention, the predicted dense depth map is generated by adopting a pixel-level addition method according to the predicted residual map and the NNI image. The predicted residual map includes residual information of the NNI image.

In accordance with one or more embodiments of the invention, the grayscale image and the sparse depth map are acquired by using a time-of-flight (ToF) sensor.

In accordance with one or more embodiments of the invention, the depth completion method further includes: performing a down-sampling process on the grayscale image, the NNI image, and the EDT image before the grayscale image, the NNI image, and the EDT image are inputted into the neural network model; and performing an up-sampling process on the predicted dense depth map. The down-sampling process and the up-sampling process are performed by bilinear interpolation with antialiasing.

In accordance with one or more embodiments of the invention, the neural network model extracts features of the grayscale image, the NNI image, and the EDT image by adopting an encoder-decoder fashion based on a UNet network architecture.

In accordance with one or more embodiments of the invention, the depth completion method further includes: performing a model pruning operation on the neural network model to compress the neural network model.

In accordance with one or more embodiments of the invention, the model pruning operation is merely performed on plural target layers of the neural network model. A number of weights of each of the target layers is larger than a threshold.

In accordance with one or more embodiments of the invention, the depth completion method further includes: performing a model clustering operation on the neural network model to further compress the neural network model after the model pruning operation is performed.

In accordance with one or more embodiments of the invention, the model clustering operation is merely performed on plural target layers of the neural network model. A number of weights of each of the target layers is larger than a threshold.

In accordance with one or more embodiments of the invention, the depth completion method further includes: quantizing the neural network model from a floating-point number model to an integer model.

The present invention further provides a system for depth completion of sparse depth map. The system includes a time-of-flight (ToF) sensor and a processor. The ToF sensor is configured to acquire a grayscale image and a sparse depth map corresponding to the grayscale image. The processor is configured to: receive the grayscale image and the sparse depth map from the ToF sensor; obtain a nearest neighbor interpolation (NNI) image and a Euclidean distance transform (EDT) image based on the sparse depth map; input the grayscale image, the NNI image, and the EDT image into a neural network model, thereby outputting a predicted residual map; and generate a predicted dense depth map according to the predicted residual map and the NNI image.

In accordance with one or more embodiments of the invention, the processor generates the predicted dense depth map by adopting a pixel-level addition method according to the predicted residual map and the NNI image. The predicted residual map includes residual information of the NNI image.

In accordance with one or more embodiments of the invention, the processor is further configured to: perform a down-sampling process on the grayscale image, the NNI image, and the EDT image before the grayscale image, the NNI image, and the EDT image are inputted into the neural network model; and perform an up-sampling process on the predicted dense depth map. The down-sampling process and the up-sampling process are performed by bilinear interpolation with antialiasing.

In accordance with one or more embodiments of the invention, the neural network model extracts features of the grayscale image, the NNI image, and the EDT image by adopting an encoder-decoder fashion based on a UNet network architecture.

In accordance with one or more embodiments of the invention, the processor is further configured to perform a model pruning operation on the neural network model to compress the neural network model.

In accordance with one or more embodiments of the invention, the model pruning operation is merely performed on plural target layers of the neural network model. A number of weights of each of the target layers is larger than a threshold.

In accordance with one or more embodiments of the invention, the processor is further configured to perform a model clustering operation on the neural network model to further compress the neural network model after the model pruning operation is performed.

In accordance with one or more embodiments of the invention, the model clustering operation is merely performed on plural target layers of the neural network model. A number of weights of each of the target layers is larger than a threshold.

In accordance with one or more embodiments of the invention, the processor is further configured to quantize the neural network model from a floating-point number model to an integer model.

In order to let above mention of the present invention and other objects, features, advantages, and embodiments of the present invention to be more easily understood, the description of the accompanying drawing as follows.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Specific embodiments of the present invention are further described in detail below with reference to the accompanying drawings, however, the embodiments described are not intended to limit the present invention and it is not intended for the description of operation to limit the order of implementation.

Figure 1:
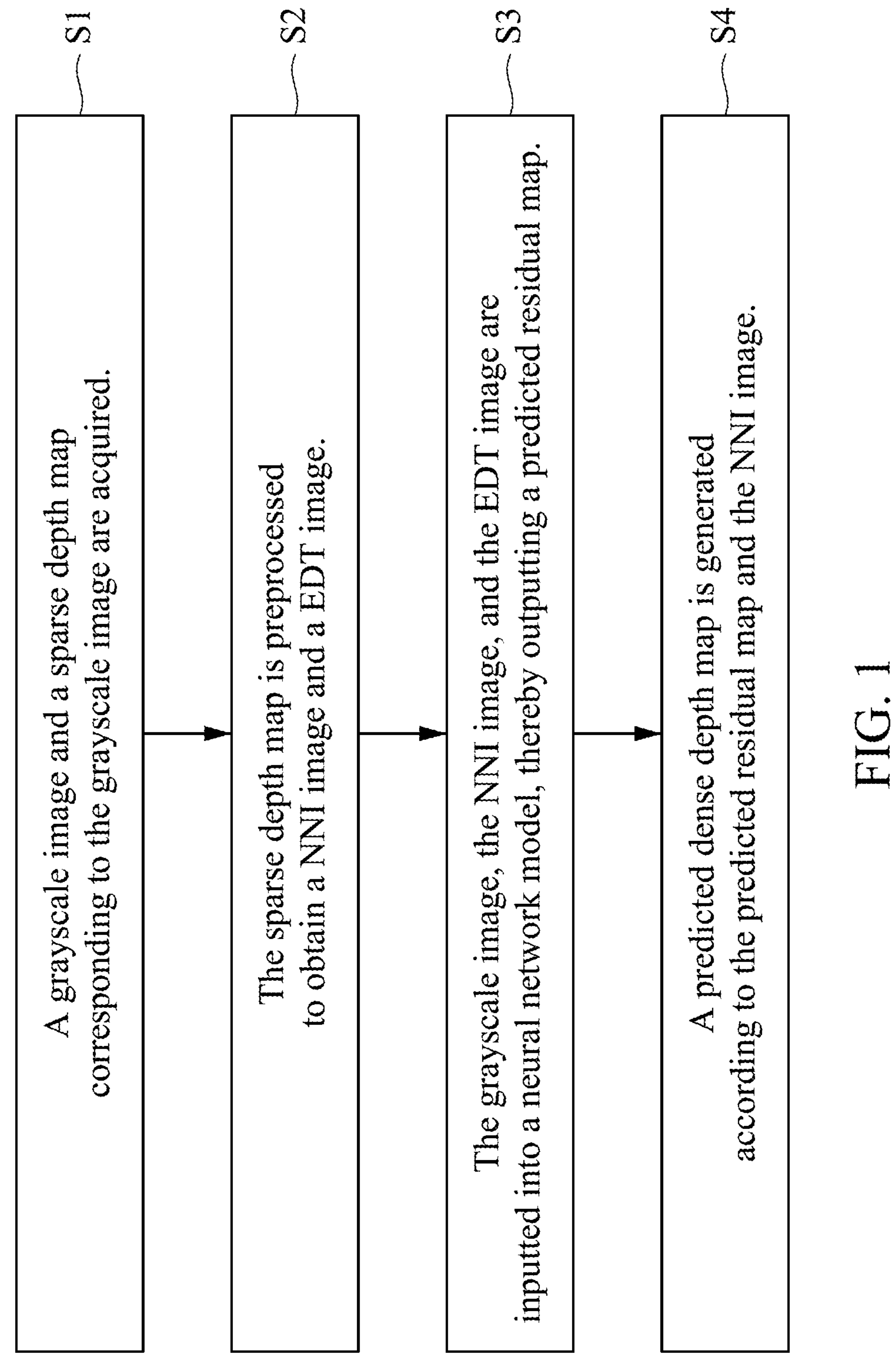
FIG. 1 illustrates a flowchart of a depth completion method of sparse depth map according to some embodiments of the present invention.
Figure 2:
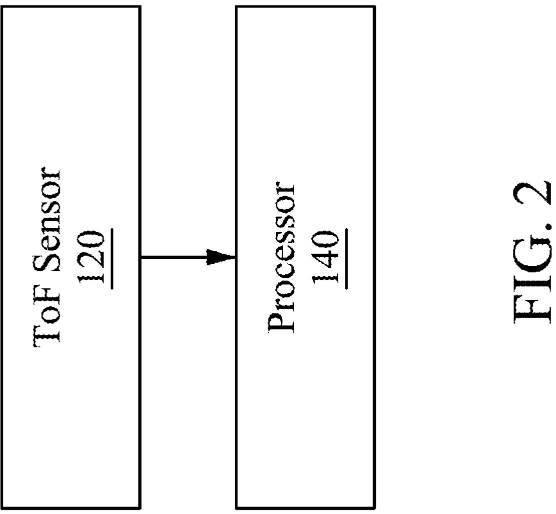
FIG. 2 illustrates a block diagram of a system for depth completion of sparse depth map according to some embodiments of the present invention.
Figure 3:
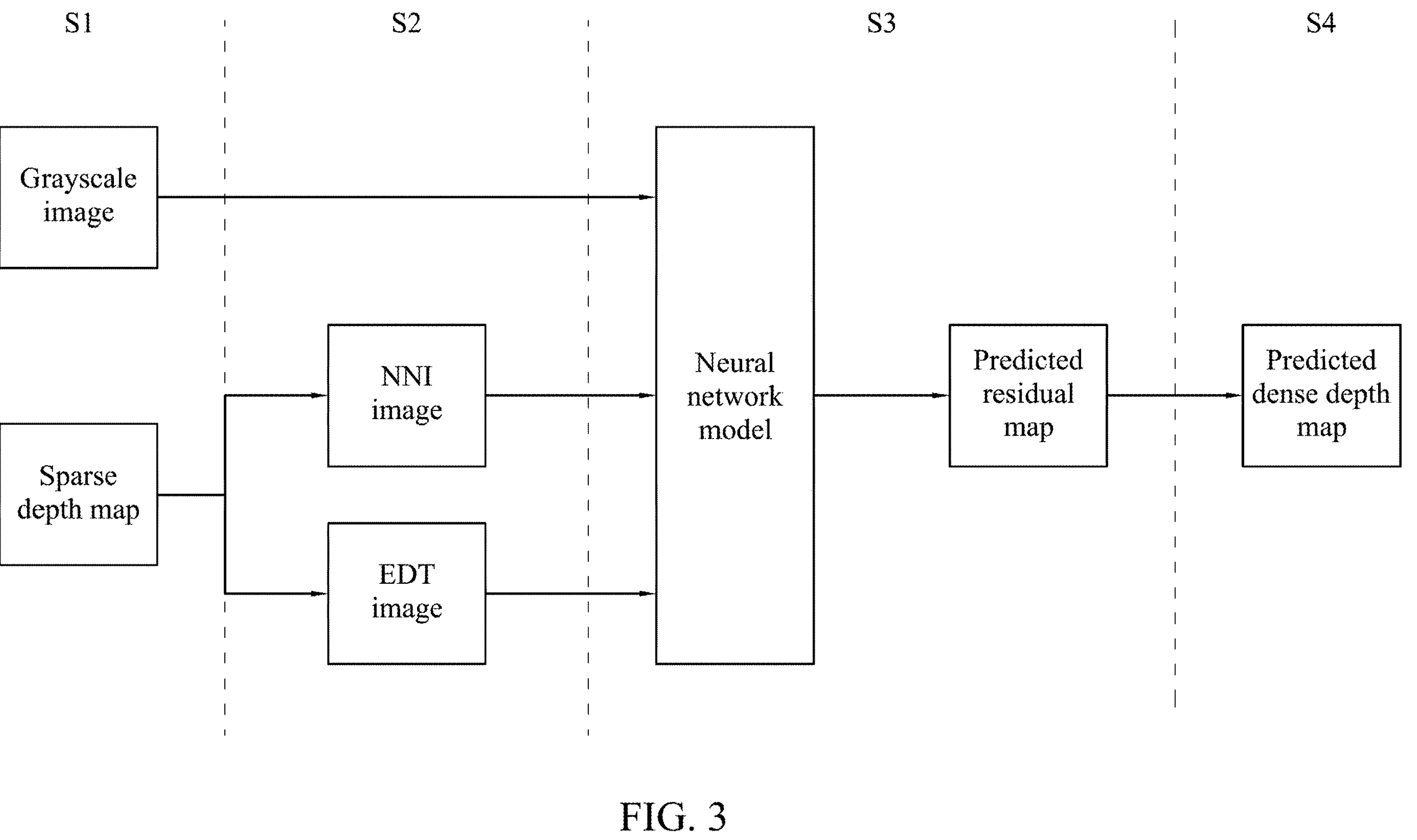
FIG. 3 shows the process flow corresponding to the depth completion method of sparse depth map as shown in FIG. 1 according to some embodiments of the present invention.

FIG. 1 illustrates a flowchart of a depth completion method of sparse depth map according to some embodiments of the present invention. FIG. 2 illustrates a block diagram of a system for depth completion of sparse depth map according to some embodiments of the present invention. FIG. 3 shows the process flow corresponding to the depth completion method of sparse depth map as shown in FIG. 1 according to some embodiments of the present invention.

As shown in FIG. 2, the system for depth completion of sparse depth map includes a time-of-flight (ToF) sensor 120 and a processor 140 communicatively connected to the TOF sensor 120.

As shown in FIGS. 1-3, the depth completion method of sparse depth map includes steps S1-S4. In step S1, the ToF sensor 120 is utilized to acquire a grayscale image and a sparse depth map corresponding to the grayscale image. In some embodiments of the present invention, the sparse depth map contains 0.1%~10% (i.e., the sparsity level at target depth map resolution) (preferably about 1%) valid pixels with useful information. Specifically, the present invention uses a single grayscale image frame together with a sparse depth map.

Specifically, the present invention uses a single capturing device (i.e., the ToF sensor 120) to acquire the grayscale image and the sparse depth map so as to simplify the system for depth completion of sparse depth map. Specifically, the present invention adopts the grayscale image (rather than RGB/color image) for feeding into the rear-stage neural network model, such that the rear-stage neural network model can be realized on resource-limited and low-power devices.

As shown in FIGS. 1-3, in step S2, the processor 140 receives the grayscale image and the sparse depth map from the ToF sensor 120, and the processor 140 preprocesses the sparse depth map to obtain a nearest neighbor interpolation (NNI) image and a Euclidean distance transform (EDT) image. Specifically, the NNI image is obtained by performing nearest neighbor interpolation (NNI), i.e., mapping each coordinate to the closest sparse depth pixel in the Euclidean sense. Specifically, the EDT image is obtained by computing the Euclidean Distance Transform (EDT), thereby giving the 2-D distance map to the nearest valid pixels.

As shown in FIG. 1, in step S3, the processor 140 inputs the grayscale image, the NNI image, and the EDT image into a neural network model, thereby outputting a predicted residual map. The neural network model is constructed by deep learning based algorithm. The neural network model may be designed encoder-decoder convolutional neural network (CNN). Specifically, the neural network model extracts features of the grayscale image, the NNI image, and the EDT image by adopting an encoder-decoder fashion based on a UNet network architecture.

Figure 4:
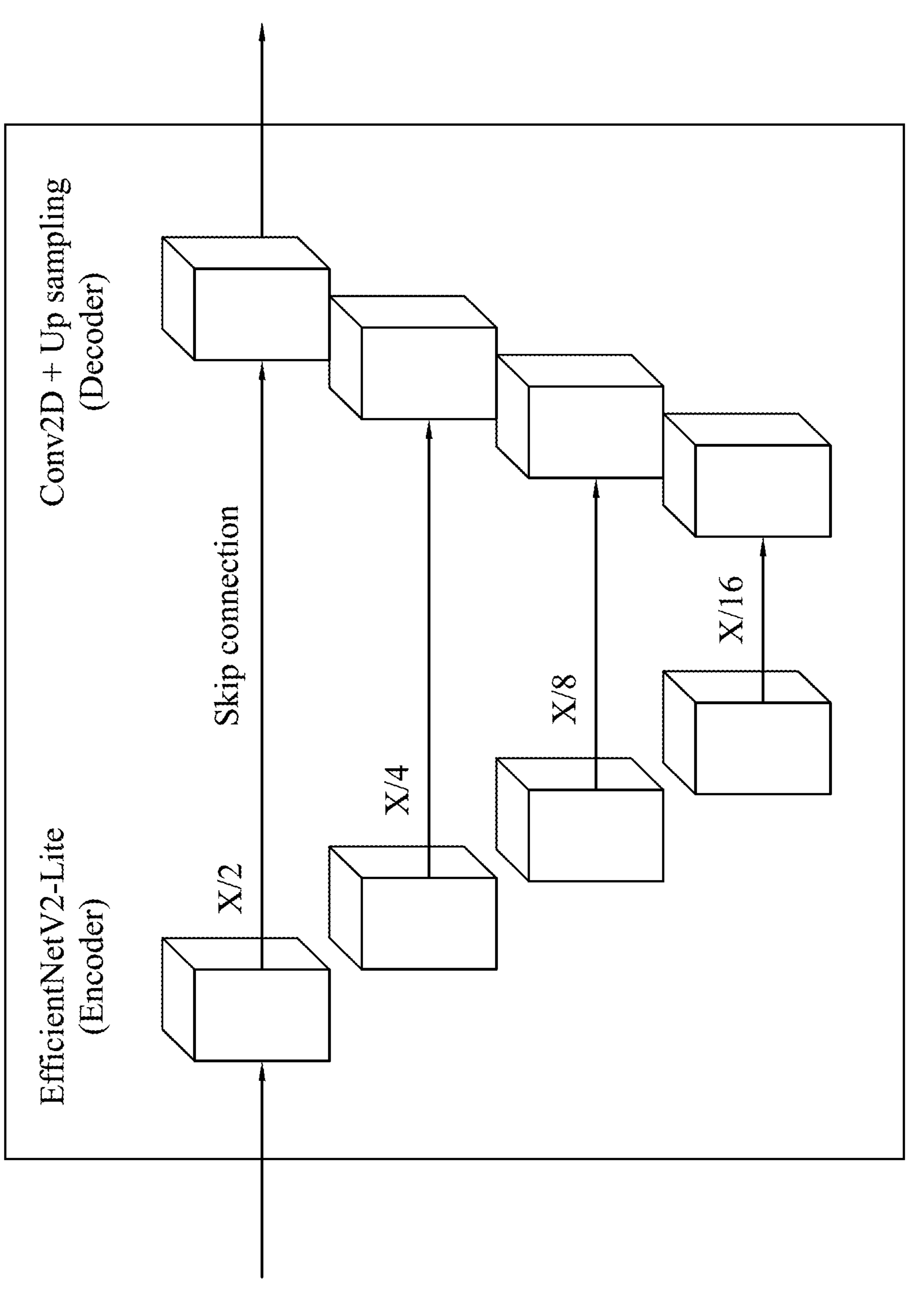
FIG. 4 illustrates an exemplary architecture of the neural network model according to some embodiments of the present invention.

FIG. 4 illustrates an exemplary architecture 1000 of the neural network model according to some embodiments of the present invention. As shown in FIG. 4, the designed encoder-decoder convolutional neural network (CNN) is a simple "U-net like" template. For example, as shown in FIG. 4, the neural network model of the present invention adopts encoder-decoder fashion composed by lite version of EfficientNetV2 (i.e., EfficientNetV2-Lite model) as feature extractor and regular Conv2D layers with nearest neighbor up-sampling as decoder. Specifically, the encoder part of the neural network model extracts features of the grayscale image, the NNI image, and the EDT image. Specifically, the decoder part of the neural network model is configured to fuse features from encoder part with add operation. All skip connections are by concatenation.

Regarding the implementation of encoder, as shown in FIG. 4, the architecture of encoder drops the last layers (of the EfficientNetV2-Lite model) which have small resolution of feature maps (X/32), such that the EfficientNetV2-Lite model of the present invention has fewer blocks to realize fewer parameters and faster inference speed. Specifically, the EfficientNetV2-Lite model of the present invention only contains Add, Pad, Cov2D, DepthwiseConv2D, ReLU6 operations for better quantization. The EfficientNetV2-Lite model is built mostly with Conv2D and DepthwiseConv2D followed by ReLU6 having less quantization loss. ReLU6 restricts activation value range in [0, 6]. No attention mechanism (Squeeze-and-Excitation block) is utilized due to bad quantization performance.

On the other hand, regarding the implementation of decoder, as shown in FIG. 4, all Conv2D has kernel_size=3 and followed by BatchNormalization and ReLU. 1 Conv2D block contains 2 Conv2D followed by 1 Upsample2D with nearest neighbor interpolation (NNI). There are 4 blocks to scale resolution from X/16 to X. Final output block has 3 Conv2D without Upsample2D and last Conv2D has kernel_size=1 with bias parameter. Implement decoder with only Conv2D followed by ReLU which is easy for quantization. It is noted that the neural network model makes decoder predict the residual map instead of whole dense depth map because residual information has smaller value range which can be better quantized.

As shown in FIGS. 1-3, in step S4, the processor 140 generates a predicted dense depth map according to the predicted residual map and the NNI image. Specifically, the predicted dense depth map is generated by adopting a pixel-level addition method according to the predicted residual map and the NNI image. The predicted residual map includes residual information of the NNI image.

Figure 5:
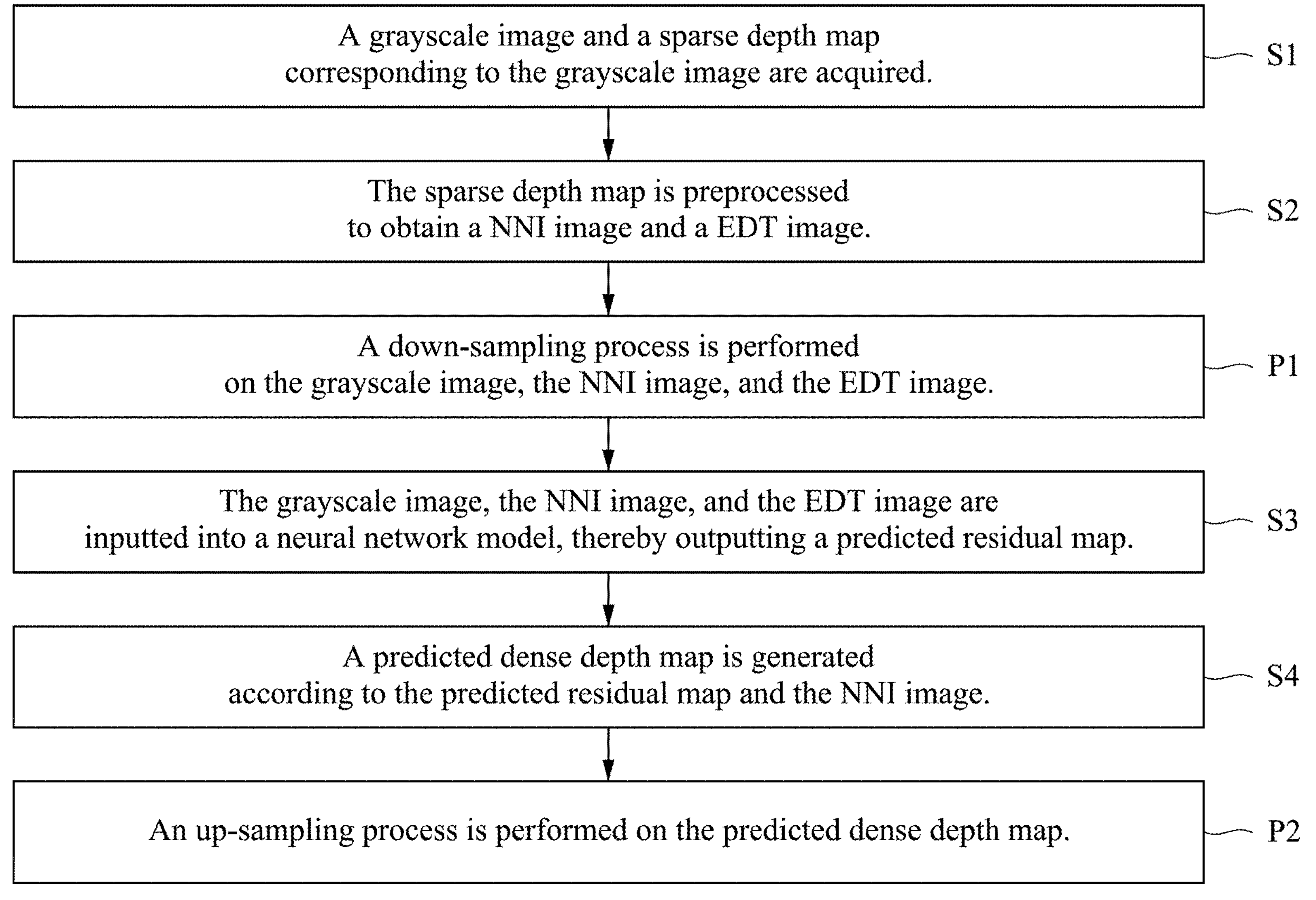
FIG. 5 illustrates a flowchart of a depth completion method of sparse depth map according to some embodiments of the present invention.

FIG. 5 illustrates a flowchart of a depth completion method of sparse depth map according to some embodiments of the present invention. The depth completion method of sparse depth map as shown in FIG. 5 is similar to the depth completion method of sparse depth map as shown in FIG. 1, but the depth completion method of sparse depth map as shown in FIG. 5 further includes steps P1 and P2.

As shown in FIG. 5, in step P1, the processor 140 further performs a down-sampling process on the grayscale image, the NNI image, and the EDT image before the grayscale image, the NNI image, and the EDT image are inputted into the neural network model. And in step P2, the processor 140 further performs an up-sampling process on the predicted dense depth map. In some embodiments of the present invention, the down-sampling process and the up-sampling process are performed by bilinear interpolation with antialiasing. For example, the resolution of the down-sampling process may be from 224×304 to 128×160 to reduce SRAM usage. For example, the resolution of the sparse depth map is resized from 480×640 to 240×320 and then center crop to 224×304, and then the resolution of each of the grayscale image, the NNI image, and the EDT image is sized to 128×160, and then the sized grayscale image, the sized NNI image, and the sized EDT image are fed into the neural network model. It is noted that the said down-sampling process is optional for the present invention. In addition, corresponding to the down-sampling process, the resolution of the predicted dense depth map is further sized to 224×304.

Figure 6:
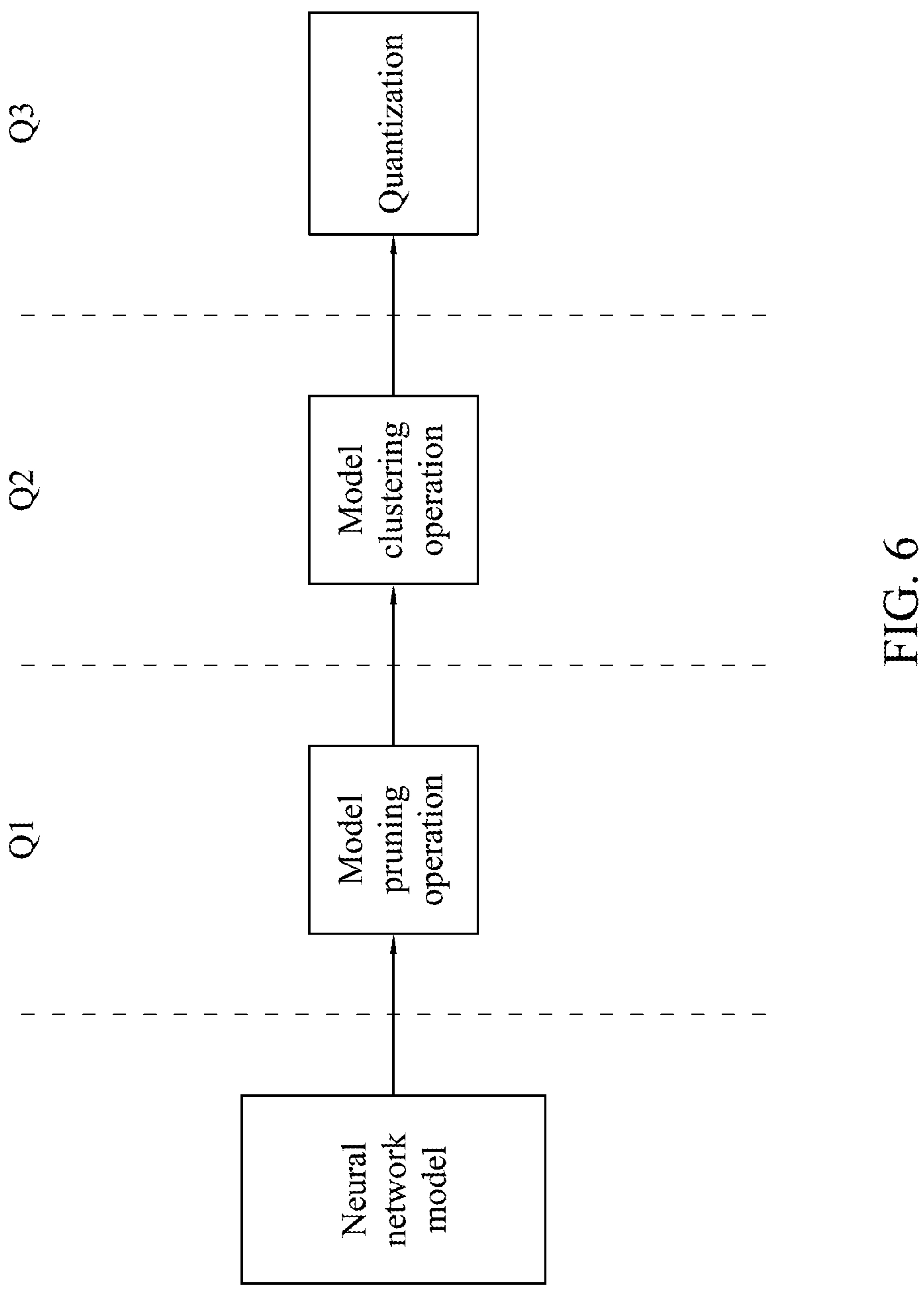
FIG. 6 illustrates an exemplary flowchart to optimize the neural network model according to some embodiments of the present invention.

FIG. 6 illustrates an exemplary flowchart to optimize the neural network model according to some embodiments of the present invention. Specifically, the present invention adopts official TensorFlow Model Optimization toolkit (TFMOT) to optimize the neural network model. As shown in FIG. 6, in step Q1, the processor 140 performs a model pruning operation on the neural network model to compress the neural network model. Specifically, the step Q1 prunes the neural network model to survey the trade-off between compression size and model performance. It is noted that the said model pruning operation is optional for the present invention.

Regarding the model pruning operation, the model pruning operation may be merely performed on plural target layers of the neural network model, also called selective pruning. Before pruning, a number of weights (n) of each of the layers of neural network model is calculated. Then, a threshold is set to find target layers which are larger and have potential redundancy. In other words, a number of weights of each of the target layers is larger than a threshold. For example, if the said threshold is 10000, the specific layer that has number of weights (n) is larger than 10000 is defined as the target layer, and then the target layer is pruned at 50% or 75% sparsity, and the other layers that are not target layers keep intact. For example, the target layer which is pruned at 50% sparsity will ensure that 50% of such layer's weights are zero. For example, if the said threshold is 5000, the specific layer that has number of weights (n) is larger than 5000 is defined as the target layer, and then the target layer is pruned at 90% sparsity, and the other layers that are not target layers keep intact. Specifically, the selective pruning performs the model pruning operation on the target layers and keeps other layers intact.

As shown in FIG. 4, in step Q2, the processor 140 performs a model clustering operation on the neural network model to further compress the neural network model after the model pruning operation is performed. Specifically, the step Q2 applies sparsity-preserved clustering to further optimize the neural network model. It is noted that the said model clustering operation is optional for the present invention.

Regarding the model clustering operation, the model clustering operation may be merely performed on plural target layers of the neural network model, also called selective clustering. Before clustering, a number of weights (n) of each of the layers of neural network model is calculated. Then, a threshold is set to find target layers which are larger and have potential redundancy. In other words, a number of weights of each of the target layers is larger than a threshold. For example, if the said threshold is 10000, the specific layer that has number of weights (n) is larger than 10000 is defined as the target layer, and then the target layer is clustered at 50% or 75% sparsity, and the other layers that are not target layers keep intact. For example, if the said threshold is 5000, the specific layer that has number of weights (n) is larger than 5000 is defined as the target layer, and then the target layer is clustered at 90% sparsity, and the other layers that are not target layers keep intact. Specifically, the selective clustering performs the model clustering operation on the target layers and keeps other layers intact.

As shown in FIG. 4, in step Q3, the processor 140 performs a post-training quantization to quantize the neural network model from a floating-point number model (i.e., the data format is FLOAT32) to an integer model (i.e., the data format is fully integer (INT8)), thereby compressing the neural network model by four times, and thus the compressed neural network model can be realized on resource-limited and low-power devices. It is noted that the said post-training quantization is optional for the present invention.

Specifically, as shown in FIG. 6, the floating-point model is further optimized by selective pruning, selective clustering and post-training quantization to int8 model. The optimized int8 model is deployed for extremely energy efficiency, and thus the optimized int8 model can be realized on resource-limited and low-power devices.

From the above description, the present invention uses an efficient and small neural network with multiple optimizations to predict dense depth map from sparse depth map and grayscale image. The efficient and small neural network with smaller model size and memory usage can be realized on resource-limited and low-power devices. The high-precision high-resolution depth image can be generated by fusing sparse depth image and corresponding grayscale image. The fusion result can improve the performance of subsequent tasks such as 3D object detection, semantic segmentation and the like.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A depth completion method of sparse depth map, comprising:

acquiring a grayscale image and a sparse depth map corresponding to the grayscale image;

obtaining a nearest neighbor interpolation (NNI) image and a Euclidean distance transform (EDT) image based on the sparse depth map;

inputting the grayscale image, the NNI image, and the EDT image into a neural network model, thereby outputting a predicted residual map; and generating a predicted dense depth map according to the predicted residual map and the NNI image;

wherein the neural network model extracts features of the grayscale image, the NNI image, and the EDT image by adopting an encoder-decoder fashion based on a UNet network architecture;

wherein the encoder-decoder fashion is composed by an EfficientNetV2-Lite model as an encoder part and Conv2D layers with nearest neighbor up-sampling as a decoder part;

wherein the EfficientNetV2-Lite model only contains Add, Pad, Conv2D, DepthwiseConv2D, ReLU6 operations, and the EfficientNetV2-Lite model is built with Conv2D and DepthwiseConv2D followed by ReLU6;

wherein the decoder part is implemented with only Conv2D followed by ReLU.

2. The depth completion method of claim 1, wherein the predicted dense depth map is generated by adopting a pixel-level addition method according to the predicted residual map and the NNI image, wherein the predicted residual map includes residual information of the NNI image.

3. The depth completion method of claim 1, wherein the grayscale image and the sparse depth map are acquired by using a time-of-flight (ToF) sensor.

4. The depth completion method of claim 1, further comprising:

performing a down-sampling process on the grayscale image, the NNI image, and the EDT image before the grayscale image, the NNI image, and the EDT image are inputted into the neural network model; and performing an up-sampling process on the predicted dense depth map;

wherein the down-sampling process and the up-sampling process are performed by bilinear interpolation with antialiasing.

5. The depth completion method of claim 1, further comprising:

performing a model pruning operation on the neural network model to compress the neural network model.

6. The depth completion method of claim 5, wherein the model pruning operation is merely performed on plural target layers of the neural network model, wherein a number of weights of each of the target layers is larger than a threshold.

7. The depth completion method of claim 5, further comprising:

performing a model clustering operation on the neural network model to further compress the neural network model after the model pruning operation is performed.

8. The depth completion method of claim 7, wherein the model clustering operation is merely performed on plural target layers of the neural network model, wherein a number of weights of each of the target layers is larger than a threshold.

9. The depth completion method of claim 1, further comprising:

quantizing the neural network model from a floating-point number model to an integer model.

10. A system for depth completion of sparse depth map, comprising:

a time-of-flight (ToF) sensor configured to acquire a grayscale image and a sparse depth map corresponding to the grayscale image; and a processor configured to:

receive the grayscale image and the sparse depth map from the ToF sensor;

obtain a nearest neighbor interpolation (NNI) image and a Euclidean distance transform (EDT) image based on the sparse depth map;

input the grayscale image, the NNI image, and the EDT image into a neural network model, thereby outputting a predicted residual map; and generate a predicted dense depth map according to the predicted residual map and the NNI image;

wherein the neural network model extracts features of the grayscale image, the NNI image, and the EDT image by adopting an encoder-decoder fashion based on a UNet network architecture;

wherein the encoder-decoder fashion is composed by an EfficientNetV2-Lite model as an encoder part and Conv2D layers with nearest neighbor up-sampling as a decoder part;

wherein the EfficientNetV2-Lite model only contains Add, Pad, Conv2D, DepthwiseConv2D, ReLU6 operations, and the EfficientNetV2-Lite model is built with Conv2D and DepthwiseConv2D followed by ReLU6;

wherein the decoder part is implemented with only Conv2D followed by ReLU.

11. The system of claim 10, wherein the processor generates the predicted dense depth map according to the predicted residual map and the NNI image by adopting a pixel-level addition method, wherein the predicted residual map includes residual information of the NNI image.

12. The system of claim 11, wherein the processor is further configured to:

perform a down-sampling process on the grayscale image, the NNI image, and the EDT image before the grayscale image, the NNI image, and the EDT image are inputted into the neural network model; and perform an up-sampling process on the predicted dense depth map;

wherein the down-sampling process and the up-sampling process are performed by bilinear interpolation with antialiasing.

13. The system of claim 10, wherein the processor is further configured to:

perform a model pruning operation on the neural network model to compress the neural network model.

14. The system of claim 13, wherein the model pruning operation is merely performed on plural target layers of the neural network model, wherein a number of weights of each of the target layers is larger than a threshold.

15. The system of claim 14, wherein the processor is further configured to:

perform a model clustering operation on the neural network model to further compress the neural network model after the model pruning operation is performed.

16. The system of claim 15, wherein the model clustering operation is merely performed on plural target layers of the neural network model, wherein a number of weights of each of the target layers is larger than a threshold.

17. The system of claim 10, wherein the processor is further configured to:

quantize the neural network model from a floating-point number model to an integer model.

* * * * *